Figure 2:
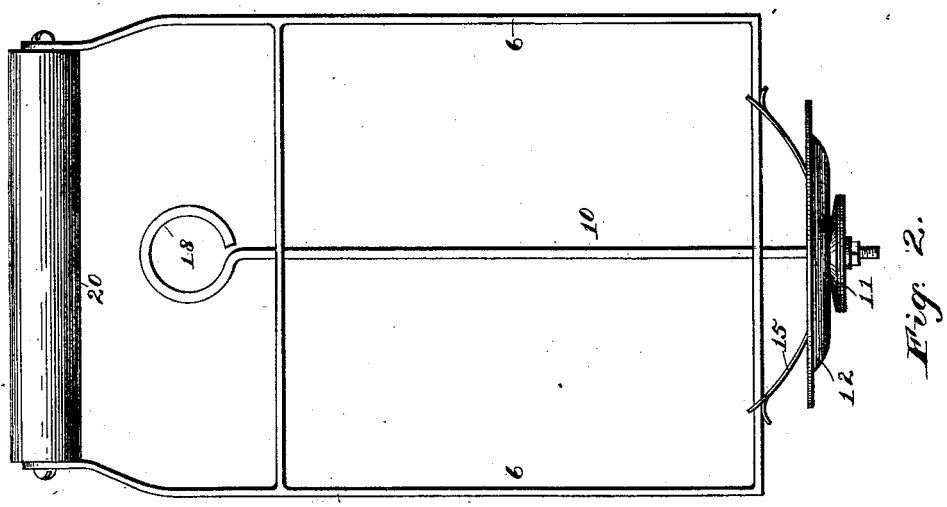

(No Model.) 2 Sheets—Sheet 1.

C. W. & C. D. PARKS.
SPRINKLER.

No. 425,626. Patented Apr. 15, 1890.

WITNESSES:
Percy C. Bowen
William O. Belt

INVENTOR
C. W. Parks
C. D. Parks
By Eason Bro
Attorneys.

(No Model.) 2 Sheets—Sheet 2.
C. W. & C. D. PARKS.
SPRINKLER.
No. 425,626. Patented Apr. 15, 1890.
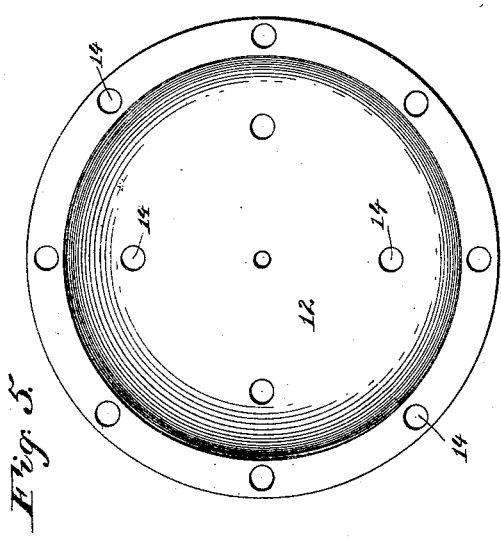
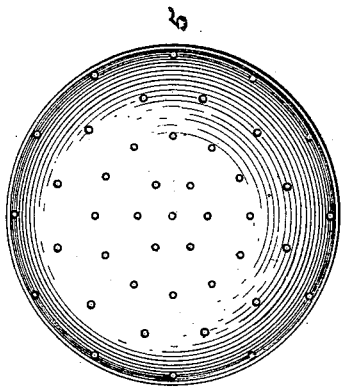
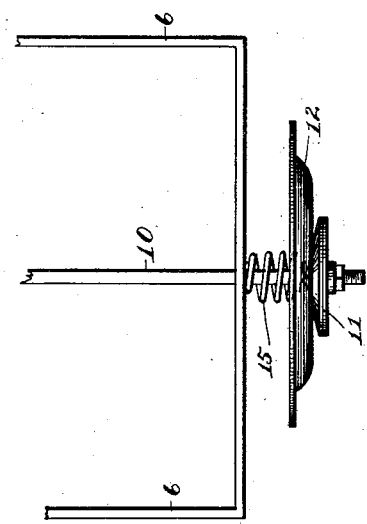
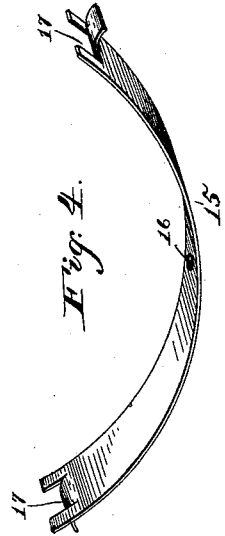
WITNESSES:
Percy C. Bowen
William O. Belt
INVENTOR
C. W. Parks and
C. D. Parks.
By Edson Bros.
Attorneys

UNITED STATES PATENT OFFICE.

CLARENCE W. PARKS, OF MECOSTA, AND CHARLEY D. PARKS, OF SARANAC, MICHIGAN.

SPRINKLER.

SPECIFICATION forming part of Letters Patent No. 425,626, dated April 15, 1890.

Application filed May 18, 1889. Serial No. 311,244. (No model.)

*To all whom it may concern:*

Be it known that we, CLARENCE W. PARKS and CHARLEY D. PARKS, of Mecosta and Saranac, respectively, in the counties of Mecosta and Ionia, respectively, and State of Michigan, have invented certain new and useful Improvements in Sprinklers; and we do hereby declare the following to be a full, clear, and exact description of the invention, such as will enable others skilled in the art to which it appertains to make and use the same.

Our invention relates to improvements in sprinklers especially adapted for distributing fluids over plants, &c.; and it has for its object, first, to provide a sprinkling device with means for agitating the contents of the can or reservoir and for normally holding the valve to its seat, which parts are so constructed and arranged that they can be expeditiously removed from the reservoir for the purpose of cleaning them, and which at the same time afford an adjustment within the can, without removing said parts, for regulating and varying the tension of the spring which holds the valve normally to its seat.

A further object of our invention is to so construct and arrange the reservoir and spraying or distributing nozzle that the latter is entirely concealed from view and protected from injury within the reservoir, which reservoir can be placed on the ground without injury to the nozzle and moved or carried over plants or shrubbery, &c., without becoming entangled therewith, while at the same time the contents of the nozzle are free to escape from the reservoir; and, finally, our invention has for its object to improve the parts in minor details with a view to promoting simplicity and durability of construction, efficiency of operation, and reduce the cost of manufacture.

With these objects in view, and such others as appertain to our invention, we provide a cylindrical reservoir or can having a rigid or stationary bottom at an intermediate point of its length, at such a distance above the lower edge of the reservoir as to receive and accommodate the spraying or distributing nozzle, which is located below and secured to the bottom at the center thereof. By arranging the bottom as described, a depending annular flange is provided at the base of the can or reservoir below the bottom, which surrounds the spraying device and serves to conceal the latter from view and protect it from injury, and this flange also serves to prevent the spraying device from becoming entangled with the plants or shrubbery over which the device is passed, and to provide a rest or support for the reservoir to adapt it to be placed on the ground without injury to the spraying device.

Through the center of the bottom is provided an opening through which the fluid contents of the reservoir pass to the spraying device, and this opening is closed when the device is not in use by a valve, which is carried by a vertical valve-stem that passes centrally and longitudinally through the reservoir or can.

To provide for agitating the fluid contents of the reservoir in order to feed the same under the necessary pressure to the spraying-nozzle to insure the proper distribution of the fluid, we provide an agitator or piston, which is fixed to the valve-stem at a point above the valve in the lower part of the reservoir and support said valve-stem in a normally stationary frame in such a manner that said valve-stem can be reciprocated vertically to cause the piston or agitator to act on the fluid and force it into and through the spraying-nozzle. It will thus be noted that the valve-stem and piston or agitator are capable of an endwise play in the reservoir, and in order to assist the operator in depressing the valve-stem and agitator to eject the fluid as well as to obviate the escape of the contents of the reservoir when the device is not in use, we provide a retracting-spring for depressing the valve-stem, its piston or agitator, and forcing the valve at the lower extremity thereof to its seat. Either a curved leaf-spring or a coiled spring may be arranged between the agitator on the valve-rod and the lower end of the stationary frame in order to normally force and hold the valve to its seat; but we prefer to employ a curved leaf-spring, which is connected at both ends to the stationary frame and rests at its middle on the agitator, which thus provides a rest for the curved spring, increases the stiffness thereof at the center where the greater strain is exerted by lifting the valve-stem and valve, and insures a uniform lift or pull on both ends of the spring when the valve is elevated. The valve-stem, with its valve and agitator, are carried by the frame, and the spring connected to said stem and frame, whereby all the parts are removable with the frame from the reservoir or can, so that all the parts can be cleansed with ease and facility, and said frame is fitted snugly within the reservoir and secured detachably thereto by suitable fastening appliances, preferably bolts. The frame is also made adjustable vertically in the reservoir in a longitudinal direction with respect to the reservoir and the valve-stem in order to vary the space between the agitator and lower cross-bar of the frame, the effect of which is to compress or distend the spring and thereby vary and regulate the tension thereof by a simple adjustment of the frame without removing the parts from the reservoir. The spring can also be regulated by means of a nut on the lower threaded end of the valve-stem, when the parts are removed from the reservoir.

We also contemplate providing the frame with an adjustable handle, so that it can be adjusted to fit the hand, to construct the spraying-nozzle so that its lower part can be removed with ease and facility to allow other parts of coarser or finer perforations to be substituted therefor, and to improve the parts in minor details of construction.

To enable others to more readily understand our invention, we will now proceed to a detailed description thereof in connection with the accompanying drawings, in which—

Figure 1:
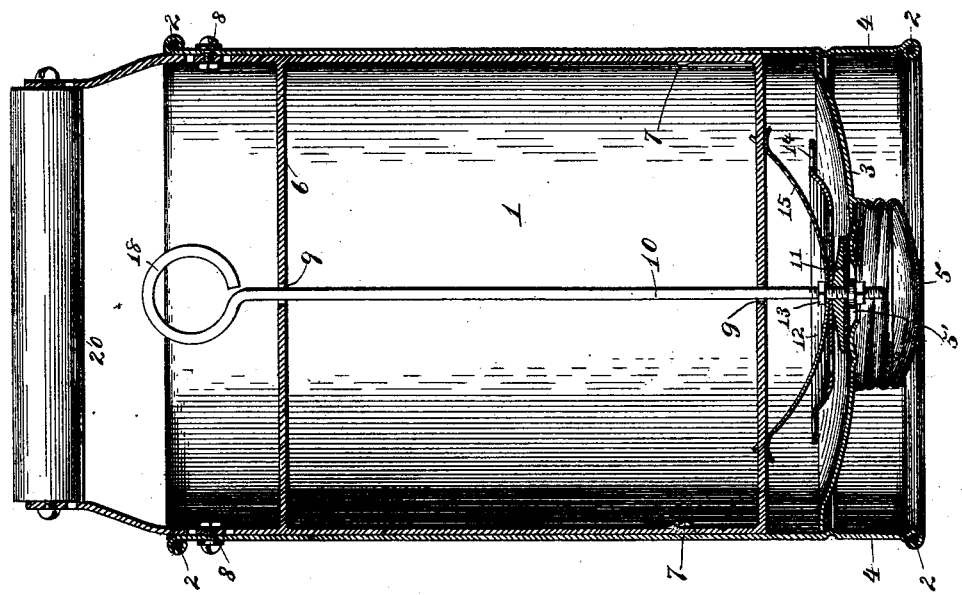

Figure 1 is a vertical central longitudinal sectional view through a sprinkler constructed in accordance with our invention. Fig. 2 is a detail view of the supporting-frame, the valve-stem and valve, the agitator and valve-retracting spring removed from the reservoir. Fig. 3 is a detail view illustrating a modified form of our invention, in which a coiled spring is substituted for the curved leaf-spring. Fig. 4 is a detail view of the valve-retracting spring. Fig. 5 is a like view of the agitator, and Fig. 6 is a similar view of the spraying-nozzle.

Like numerals of reference denote corresponding parts in all the figures of the drawings, referring to which—

1 designates the reservoir or can of our improved sprinkler, which is preferably made cylindrical and open at its ends. In practice we prefer to make the can of sheet metal and wire the edges thereof, as at 2, in order to strengthen the can.

Near the bottom of the reservoir or can, and at a suitable distance above its lower edge, we provide a bottom 3, which is rigidly united to the reservoir in any well-known manner to secure a fluid-tight joint therewith, which arrangement of the bottom with relation to the reservoir provides a depending annular flange or base 4 below the stationary bottom, within which the spraying-nozzle is arranged and protected. The spraying-nozzle 5 is secured centrally to the bottom of the reservoir, so as to communicate directly with an opening 5' in said bottom and receive the fluid contents of the can or reservoir.

The stationary spraying-nozzle is perforated to permit the fluid that enters the nozzle from the reservoir to be sprayed and uniformly distributed through the nozzle, and the lower part of the nozzle is detachably connected or secured to the upper part thereof to permit other sections or parts having different size perforations to be substituted therefor, in order to vary the fineness of the spray and adapt the sprinkler for distributing fluids of different kinds—as, for instance, water, paris-green in solution, or other fluids—as is obvious.

6 is the supporting-frame for the valve-stem and other parts of our invention which coact therewith, and this frame is fitted snugly and held rigidly in place within the reservoir by means of fixed lugs 7 on the reservoir, which embrace the sides of said frame, and by suitable fastening devices 8, which preferably consist of removable bolts, as shown. The lugs permit the frame to be moved or adjusted readily in a vertical plane, and the sides of said frame are provided with a series of perforations, through either of which the fastening-bolts can be passed to hold said frame at the desired elevation, for the purpose of varying and regulating the tension of the valve-retracting spring.

Through the horizontal cross-bars of the supporting-frame are formed aligned openings 9, and in these openings is fitted a valve-stem 10, which is carried by said frame so as to be free to slide endwise therein a limited distance. To the lower extremity of this valve-rod is secured a valve 11, which is adapted to fit over and close the outlet port or opening in the bottom of the reservoir, said valve being clamped against a piston or agitator 12 by means of a nut 13, which is fitted on the threaded lower extremity of the valve-rod, as shown in Figs. 1 and 2.

The piston or agitator 12 is secured rigidly to the valve-stem in any suitable manner at a point above the valve, and it comprises a flat disk, which we prefer to provide with a peripheral flange, as shown, and to form a series of transverse apertures 14 therein to provide for the ready passage of the fluid below the agitator-disk and obviate clogging of the valve by any sediment that may become deposited thereon.

The retracting-spring 15 is fitted around the valve-stem so as to be held by the same against displacement, and interposed between the piston or agitator and the lower cross-bar of the supporting-frame. This spring may be of the coiled pattern, as shown in Fig. 3; but we prefer to employ the curved leaf-spring shown in Figs. 1, 2, and 4. This spring is made of a single piece of metal curved longitudinally, as shown, and provided at its middle with an aperture 16, through which the valve-stem passes, and at its ends with notches 17, in which is fitted the lower cross-bar of the frame.

It will be noted that the piston or agitator provides a rest for the valve and the spring, and when the leaf-spring is employed between the frame and the piston or agitator the latter serves to uniformly compress the spring and increase its rigidity at the center, at which point the greatest strain or pull is exerted.

The upper end of the valve-stem is provided with a handle 18, by which it can be reciprocated vertically to operate the piston or agitator and cause it to properly agitate the contents of the vessel, which prevents any disposition of sediment on the valve or adjoining parts and thus obviates clogging of the sprinkler, and as the stem is raised the valve is opened to permit the fluid to escape into the spraying-nozzle; but when said stem is lowered the valve closes and cuts off the escape of the fluid.

The sides of the upper extremity of the supporting-frame are extended above the upper cross-bar, as shown, and perforated, and to said extended ends is connected by suitable bolts a handle 20, by which the sprinkler can be carried. The upper end of the frame, when fitted in and secured to the reservoir, extends above the latter, and the handle 20 can be adjusted vertically on the frame to adapt the sprinkler to be carried conveniently.

The operation and advantages of our invention will be readily understood from the foregoing description, taken in connection with the drawings.

We would have it understood that we do not restrict ourselves to the exact details of construction and form and proportion of parts herein shown and described as an embodiment of our invention, but hold ourselves at liberty to make such changes and alterations therein as fairly fall within the spirit of our invention.

Having thus fully described our invention, what we claim as new, and desire to secure by Letters Patent, is—

1. In a sprinkler, the combination of a can or reservoir, a supporting-frame arranged longitudinally within said reservoir and removably fixed in position therein, a valve-stem supported in horizontal bars which form a part of said removable frame and carrying a valve adapted to close an outlet in the bottom of said reservoir, and a spring which is located within the can or reservoir and bears against the lower bar of said frame to depress the valve-stem, whereby the valve-stem and spring are withdrawn from the can or reservoir when the frame is removed therefrom, substantially as described.

2. In a sprinkler, the combination of a reservoir, a supporting-frame arranged longitudinally within said reservoir and detachably secured thereto, an endwise-movable stem supported in said frame and removable therewith, and an agitator or piston secured to the lower end of the stem below the removable frame, and the spring which bears against the lower end of said frame, substantially as described, for the purpose set forth.

3. In a sprinkler, the combination of a reservoir having an outlet in its bottom, a supporting-frame detachably secured within said reservoir, an endwise-movable valve-stem fitted in said frame and carrying a valve and an agitator or piston, and a spring arranged between the lower end of the removable frame and the valve to normally force the valve-stem downward, all arranged and combined for service substantially as herein shown and described, for the purpose set forth.

4. In a sprinkler, the combination of a reservoir having an outlet in its bottom, a supporting-frame adjustable vertically within said reservoir and normally secured in a fixed position therein, endwise-movable valve-stem fitted in said frame and carrying a valve at its lower end, and a spring interposed between the lower end of said frame and the valve, substantially as described, for the purpose set forth.

5. In a sprinkler, the combination of a reservoir having an outlet in its bottom, a supporting-frame adjustable vertically within said reservoir and normally secured in a fixed position therein, a valve-stem fitted in the frame and having a valve, an agitator fixed to the valve-stem at a point above the valve, and a curved spring resting at its middle on the agitator and connected at its ends to the base of the frame, substantially as described, for the purpose set forth.

6. In a sprinkler, the combination, with a reservoir, of a vertically-adjustable frame, a valve-stem carrying a valve and agitator or piston, and a curved spring interposed between the base of the frame and the agitator, the ends of said spring being connected to the frame and the center thereof resting on the agitator, substantially as described, for the purpose set forth.

7. In a sprinkler, the combination of a reservoir having the lugs, a removable frame fitted within the reservoir between said lugs and detachably secured in place therein by bolts which pass through apertures in the frame, and a valve-stem supported in the cross-bars of the frame and carrying a valve arranged to close the outlet in the bottom of the reservoir, substantially as described.

8. In a sprinkler, a removable frame having the sides thereof extended and perforated, as described, and a handle detachably and adjustably secured to said extended ends of the frame, substantially as and for the purpose described.

9. In a sprinkler, the combination of a reservoir having a central outlet in its bottom, a spraying-nozzle fixed to the lower side of said bottom and communicating with the reservoir through the central outlet, a supporting-frame removably fixed within the reservoir above and out of contact with the bottom thereof, a valve-stem fitted within said frame and carrying a valve at its lower end, a perforated agitator or piston secured to the valve-stem below the frame, and a spring interposed between said frame and the agitator or piston, all combined and arranged substantially as and for the purpose described.

In testimony whereof we affix our signatures in presence of two witnesses.

CLARENCE W. PARKS.
CHARLEY D. PARKS.

Witnesses:
O. J. BLACKFORD,
B. T. JOHNSON.